8618X
A. Porter.
Thrashing Mach.
Patented Jan. 23, 1835.
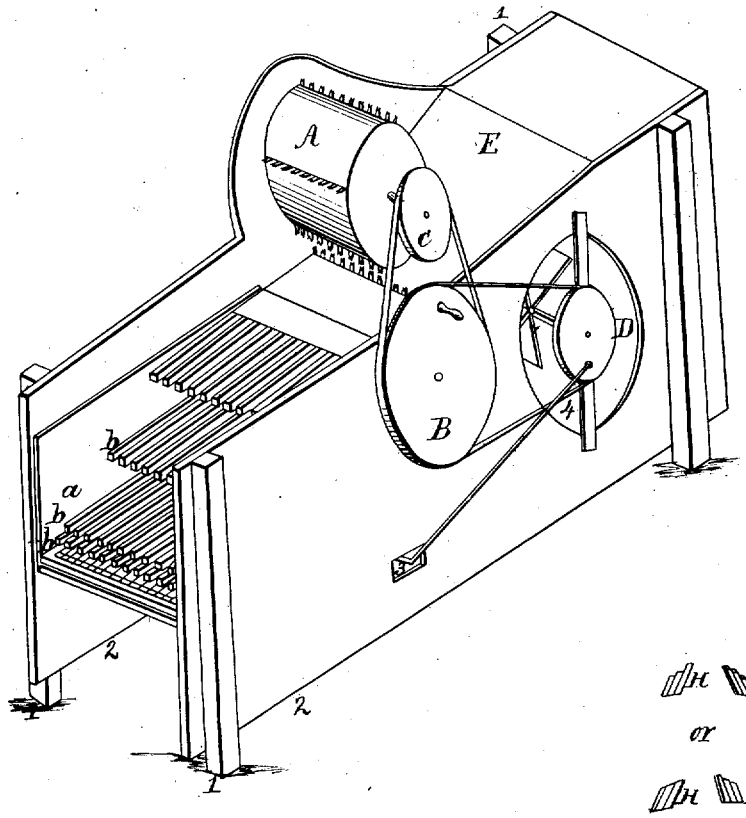
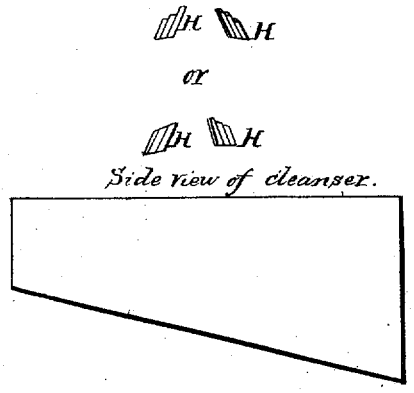

Jan. 23. 1835    8618X    21.

Alexander Porter New Virginia, Maine

Letters Patent

The Schedule referred to in these Letters Patent and making part of the same Containing a description in the words of the said Alexander Porter himself of his Improvement in the Threshing Machine & Cleaner for Grain.

To all to whom these presents shall come Be it known that I Alexander Porter of New Vinyard in the County of Somerset and State of Maine Farmer have invented a new and useful improvement in the Threshing Machine and in the Mode of winnowing and Cleaning Grain connected therewith & that the following is a full and exact description thereof.

I take four posts Figs 1111, four feet high mortised for a frame on which I fasten ^mortice^ side pieces of plank about six feet long Figs 22 and the width between the side pieces to be about three feet. Fig. A represents a wooden or cast iron Cylinder in which are inserted four rows of teeth to which play into a bed piece of cast iron with one row of teeth similar to those in the Cylinder. Fig B. represents the main wheel, working into the wheel fig C which drives the Cylinder A either with bands or with gearing & connected with the same wheel is Fig D another wheel which drives the fans of the winnowing Machine. Fig E represents the apron on which is placed the grain before it is thrashed. The teeth represented by Fig H are of cast or wrought iron and cast with the bar or inserted into a plate, and the bar or plate is fastened into the wooden Cylinder. The teeth are wedge formed graduated by projections at the tops and in the Centre as represented by Fig. H. The Cleaner is formed by two side pieces a, a, formed so as to be admitted within the sides of the thrashing Machine and into the sides are four or more or less slide combs b b b b, with long teeth made of wood or iron on which the grain and straw after thrashing are [illegible]

The top Comb has teeth about two feet long and the others being about the same length project forward about six inches each beyond the other and forming a gradual descent and under these Combs is a wire Seive through which the grain passes on to a fine seive which is

8618X calculated to let off the fine seeds & not the grain but the grain passes through an orifice or Spout in the side of the cleaner the cleaner is shaked by a crank Fig 3 attached to the [illegible] of the winnowing machine and communicates its motion by a crooked sweep Fig 4 The machine may be driven by horse, water, hand, or any other power. The cleaner is intended to be used also with a common winnowing machine as well as in the thrashing machine.

What I claim as my own invention and not previously known is the wedge form and graduated projections of the teeth and the cleaner as formed of long teeth making a sieve by one count gradually projecting beyond the other

Alexander Porter

[illegible] Witnesses
[illegible] Enoch Craig
Philip M. Stubbs (Drawing.)

[585 w.]